(12) United States Patent
Northrop et al.

(10) Patent No.: US 8,287,734 B2
(45) Date of Patent: Oct. 16, 2012

(54) METHOD FOR TREATING NITROGEN IN WASTE STREAMS

(75) Inventors: Jere Northrop, Amherst, NY (US); James W. Morris, Standish, ME (US)

(73) Assignee: Bion Technologies, Inc., Standish, ME (US)

(*) Notice: Subject to any disclaimer, the term of this patent is extended or adjusted under 35 U.S.C. 154(b) by 388 days.

(21) Appl. No.: 12/713,011

(22) Filed: Feb. 25, 2010

(65) Prior Publication Data

US 2010/0219125 A1 Sep. 2, 2010

Related U.S. Application Data

(60) Provisional application No. 61/208,843, filed on Feb. 27, 2009.

(51) Int. Cl.
*C02F 3/30* (2006.01)
(52) U.S. Cl. ............... 210/605; 210/630; 210/903
(58) Field of Classification Search ........... 210/605, 210/621, 630, 194, 197, 903
See application file for complete search history.

(56) References Cited

U.S. PATENT DOCUMENTS

| | | | | |
|---|---|---|---|---|
| 3,764,523 A | * | 10/1973 | Stankewich, Jr. | 210/604 |
| 5,137,636 A | * | 8/1992 | Bundgaard | 210/605 |
| 5,908,554 A | * | 6/1999 | Tholander et al. | 210/605 |
| 6,689,274 B1 | * | 2/2004 | Northrop et al. | 210/601 |
| 6,908,495 B2 | * | 6/2005 | Northrop et al. | 71/9 |

FOREIGN PATENT DOCUMENTS

| | | |
|---|---|---|
| DE | 10001181 A1 * | 10/2001 |
| EP | 0562466 A1 * | 9/1993 |

* cited by examiner

*Primary Examiner* — Fred Prince
(74) *Attorney, Agent, or Firm* — Brad M. Behar & Associates, PLLC (57) ABSTRACT

The present invention is directed to a novel process and method for treating nitrogen that is contained in an organic waste stream using aeration at a preferred predetermined mass loading in an aerobic volume followed by treatment in an anoxic/anaerobic volume. The present invention also includes the solid humus material produced from the treatment of an organic waste stream aeration at a predetermined loading in an aerobic volume followed by treatment in an anoxic/anaerobic volume and the removal of said humus solids.

40 Claims, 5 Drawing Sheets

METHOD FOR TREATING NITROGEN IN WASTE STREAMS

CROSS-REFERENCE TO RELATED APPLICATIONS

This application claims the benefit of U.S. Provisional Patent Application Ser. No. 61/208,843, filed on Feb. 27, 2009, which is expressly incorporated herein in its entirety by reference thereto.

BACKGROUND OF THE INVENTION

The present invention relates to a novel process and method for the treatment of liquid organic wastes, particularly animal farm wastes, including the removal of nutrients from such wastes, such as, for example, nitrogen. Waste solids which contain nitrogen, and gasses which contain nitrogen as ammonia, nitrogen oxides, or various small molecular weight nitrogen containing organic compounds such as amines, amino acids or the like, may also be treated by the process of this invention if the solids or gases are first suspended or dissolved in an aqueous stream.

Organic waste streams are continuously created that need to be treated in some form or manner before they are disposed of. For example, organic waste streams in conventional municipal waste and wastewater plants, food manufacturing facilities, industrial factories, and animal farms are typically treated either physically, chemically, and/or biologically before combining the effluent(s) with a water body, land applying the effluent(s), or disposing of the effluent(s) in an alternative manner, such as by removal from the site for further treatment elsewhere.

Presently, most treatment technologies for organic wastes typically include some form of biological treatment wherein biological organisms stabilize organic matter and remove soluble and/or non-settleable colloidal solids to reduce the content of microbial substrates (nutrients such as phosphorus, sulfur and particularly nitrogen and other organic biodegradable materials as measured by the total biochemical oxygen demand (BOD) test). The microbial substrates, particularly if left untreated, are known to pollute surface and subsurface water supplies and negatively impact air and soil quality. Suspended growth processes, attached-growth processes and combined suspended and attached growth processes are used for biological treatment of organic wastes to reduce substrate quantities in the treated effluents. Often times, waste streams and the microbial substrates therein are also subjected to additional treatment processes prior to the disposal of process effluents such as, for example, screening, digestion, composting, disinfection, chemical precipitation, and/or phosphorous removal.

With increasing human population density, municipal wastewater treatment facilities, animal farming facilities, and organic industrial treatment and food processing facilities have come under increasing pressure to upgrade, modify, or supplement their treatment processes to improve the quality of system effluent discharges as well as the air in and around such facilities to further protect the environment, and human and animal health. A particularly persistent problem addressed by the present invention is the treatment of animal excrement containing high concentrations of microbial substrates which, in typical animal treatment systems, not only pollute surface and subsurface water supplies, but also negatively impact air and soil quality. The effluent discharges from these animal treatment systems oftentimes contain undesired amounts of available nitrogen and phosphorous which has been linked to detrimental effects in water bodies such as, for example, accelerated eutrophication and undesirable aquatic growths. Further, present treatment alternatives for organic waste streams, such as animal excrement, frequently generate and exacerbate the offensive odors and emissions of atmospheric pollutants.

Two existing modes to treat nitrogen, typically expressed as reduced nitrogen in the form of total Kjeldahl nitrogen (TKN), in biological waste streams are generally known:

In most conventional wastewater treatment systems, pretreatment of carbonaceous materials such as BOD and chemical oxygen demand (COD) removal is performed prior to the treatment of nitrogen through nitrification and denitrification. When using biological mechanisms for pretreatment, aerobic treatment processes are typically utilized wherein oxygen is added to achieve dissolved oxygen concentrations of greater than 2 milligrams per liter (mg/L). The resulting biological pretreatment process utilizes a broad array of heterotrophic microorganisms primarily to oxidize carbonaceous materials (BOD/COD) to very low levels and the organic nitrogen portion of TKN present is typically converted to ammonia which will be present as soluble ammonium ions. The carbonaceous oxidizing heterotrophs grow very rapidly and in most instances would displace the slower growing nitrifiers, if present, and outcompete the nitrifiers for the available oxygen unless the nitrifiers are grown in a separate volume (or placed in reactors controlled to allow slow rate processing by having very long hydraulic retention times (HRT) and solids retention times (SRT) allowing the nitrifiers to successfully coexist with the carbon oxidizing heterotrophs in what is generally referred to as a single sludge system that also accomplishes near complete carbonaceous oxidation). The existence of relatively high dissolved oxygen levels (e.g., greater than about 2.0 mg/L) allows a wide variety of heterotrophic microorganisms to flourish and these microorganisms will oxidize significant quantities of any carbonaceous material present in the waste stream. Usually, when the pretreatment is followed by conventional nitrification/denitrification, the carbonaceous oxidation performed by heterotrophic microorganisms will have to occur before the much slower growing nitrifiers can effectively act on the ammonia/ammonium within the waste stream.

Following pretreatment, conventional nitrification/denitrification treatment utilizes two distinct and separate tanks or volumes that are used to sequentially treat the nitrogen containing stream. The first volume is aerobic, usually having a dissolved oxygen concentration of greater than 2.0 mg/L. Within this aerobic volume two types of bacteria comprising *Nitrosomonas* and *Nitrobacter* species (and potentially others) oxidize the ammonia to, and organically bind nitrogen in the form of, nitrite and nitrate, which is referred to as nitrification.

Based on the theoretical stoichiometry for the biological nitrification process 4.57 g $O_2$/g N is needed for complete oxidation of ammonia to nitrate. When taking into account the additional oxygen consumption necessary to remove carbonaceous material during pretreatment, more oxygen consumption than necessary for the nitrification process alone is required for the total treatment system to a degree that ultimately depends upon the amount of bioavailable BOD/COD present in a given waste stream relative to its nitrogen content (TKN) and the composition or characteristics of the wastewater. As an example, a conventional nitrification system for municipal wastewater may use about 8 to 10 g $O_2$/g N for complete oxidation of ammonia to nitrate with oxygen consumption for BOD/COD. See Metcalf & Eddy (2003) "Wastewater Engineering, Treatment and Reuse," 4th Ed.

Tchobanoglous, George; Burton, Franklin L. and Stensel, H. David, McGraw-Hill, Boston, Mass., USA, ISBN 0-07-041878-0, pp 612-614 for a discussion of the stoichiometry for the nitrification process and see pages 703 to 720 for an example of the oxygen loading to a conventional nitrification system. Of the 4.57 g $O_2$/g N needed for complete oxidation of ammonia to nitrate, 3.43 g $O_2$/g N is used for nitrite production and the remaining 1.14 g $O_2$ are used per g $NO_2^-$ oxidized to nitrate. Id. When accounting for oxygen consumption into cell mass into the stoichiometry, the ratios decrease to 4.25 g $O_2$/g N needed for complete oxidation of ammonia and 3.22 g $O_2$/g N used for nitrite production. Id. Accordingly, it would be beneficial and preferable to treat nitrogen through a mechanism that avoids the need for pretreatment of BOD/COD, avoids oxygen consumption for total nitrification, and also achieves denitrification of nitrite without conversion of the nitrite to nitrate such as, for example, as described in U.S. Pat. Nos. 6,689,274 (Morris and Northrop) and 6,908,495 (Morris and Northrop) which are expressly incorporated herein by reference thereto in their entireties as if restated here in full. Such a process would consume less oxygen and thus potentially cost less to operate.

Returning to the conventional nitrification and denitrification system, the effluent from the aerobic volume then flows into a second tank or volume which is anoxic or anaerobic and has a near zero free oxygen concentration of less than about 2.0 mg/L, and usually much less than about 0.2 mg/L. In the anoxic/anaerobic volume the nitrite and nitrate are denitrified by a variety of heterotrophic denitrifying microbes and dimolecular nitrogen gas ($N_2$) is produced as an end product which is then discharged to atmosphere. In general, the microorganisms which perform the nitrification function are resident within the aerobic volume or tank, and the microorganisms which perform the denitrification function are resident within the anoxic/anaerobic volume or tank for the two tank systems. There are a number of configurations wherein the two populations are mixed but exposed sequentially to aerobic then anoxic/anaerobic conditions in order for the nitrifying population to nitrify in the aerobic volume and the denitrifying portion of the population to denitrify in the anoxic/anaerobic volume. The effluent from the anoxic/anaerobic volume will usually have a lower concentration and total quantity of nitrogen than will the influent stream to the aerobic volume as this is the process goal. This is due partly to some nitrogen being discharged to atmosphere as nitrogen gas and partly due to the periodic removal of solids from both the aerobic and anoxic/anaerobic volumes. These solids will contain microbes which in turn contain nitrogen.

There are on the order of about twelve or more process configurations in current use to remove nitrogen from wastewaters employing biological nitrification and denitrification. In general each requires a SRT anywhere from about 10 to 20 days and a HRT totaling about 10 to 30 days with a SRT of about 2 to 8 days for the anoxic denitrifying population and SRTs of about 3 to 12 days for the aerobic volume nitrifying organisms. The internal recycle ratios required to achieve process goals ranges from 100:1 to 400:1. Id. at pp 789-98.

A second known system that achieves simultaneous nitrification and denitrification is described in U.S. Pat. Nos. 6,689,274 (Morris and Northrop) and 6,908,495 (Morris and Northrop). In the second system, simultaneous nitrification and denitrification occurs without the need for any pretreatment of carbonaceous materials such BOD and COD. There is usually only one volume or environment, termed an aqueous environment wherein there is a low but non zero concentration of dissolved oxygen. Generally the dissolved oxygen concentration within this volume is kept below 2.0 mg/L and usually it does not exceed 0.1 mg/L. Within the aqueous environment nitrification and denitrification occur simultaneously, and although different microorganisms perform the respective nitrification and denitrification steps, the microorganisms generally coexist with each other in a mixed state within the same volume. Nitrogen is discharged to atmosphere as dimolecular nitrogen gas, and solids containing microbes and hence nitrogen is periodically removed from the aqueous volume or from the effluent.

Evolution of a natural microbial community is encouraged under low dissolved oxygen conditions leading to a plurality of desirable ecological niches. When the flowable organic waste stream contains relatively high concentrations of total BOD and TKN, and the TKN to total BOD by weight ratio is relatively high, e.g. when the mass ratio of TKN to total BOD is more than about 1:20 by weight, and preferably more than about 3:20, the resulting low oxygen bioconversion process is an effective processing approach for rapid, substantially odorless, bioconversion of the waste stream substrates. The influent oxygen loading and the dissolved oxygen concentration in the biological treatment process are suitably regulated to maintain a dissolved oxygen concentration of less than about 2.0 mg/L, preferably less than about 0.1 mg/L, in the aqueous portion of the process, to form a series of compatible, and overlapping and simultaneously occurring, ecological niches that promote the growth and coexistence of desirable major populations of facultative heterotrophic fermentors, autotrophic nitrifiers, facultative heterotrophic denitrifiers, and autotrophic ammonium denitrifiers to the growth inhibition of other microbial populations such as heterotrophic aerobes, which usually dominate the bacteria present in conventional wastewater treatment processes. A schematic illustration of the interrelationships believed to exist between these microorganisms and the major substrates being affected during the bioconversion process is disclosed in FIG. 1 of those patents which is replicated herein as FIG. 1.

Figure 1:
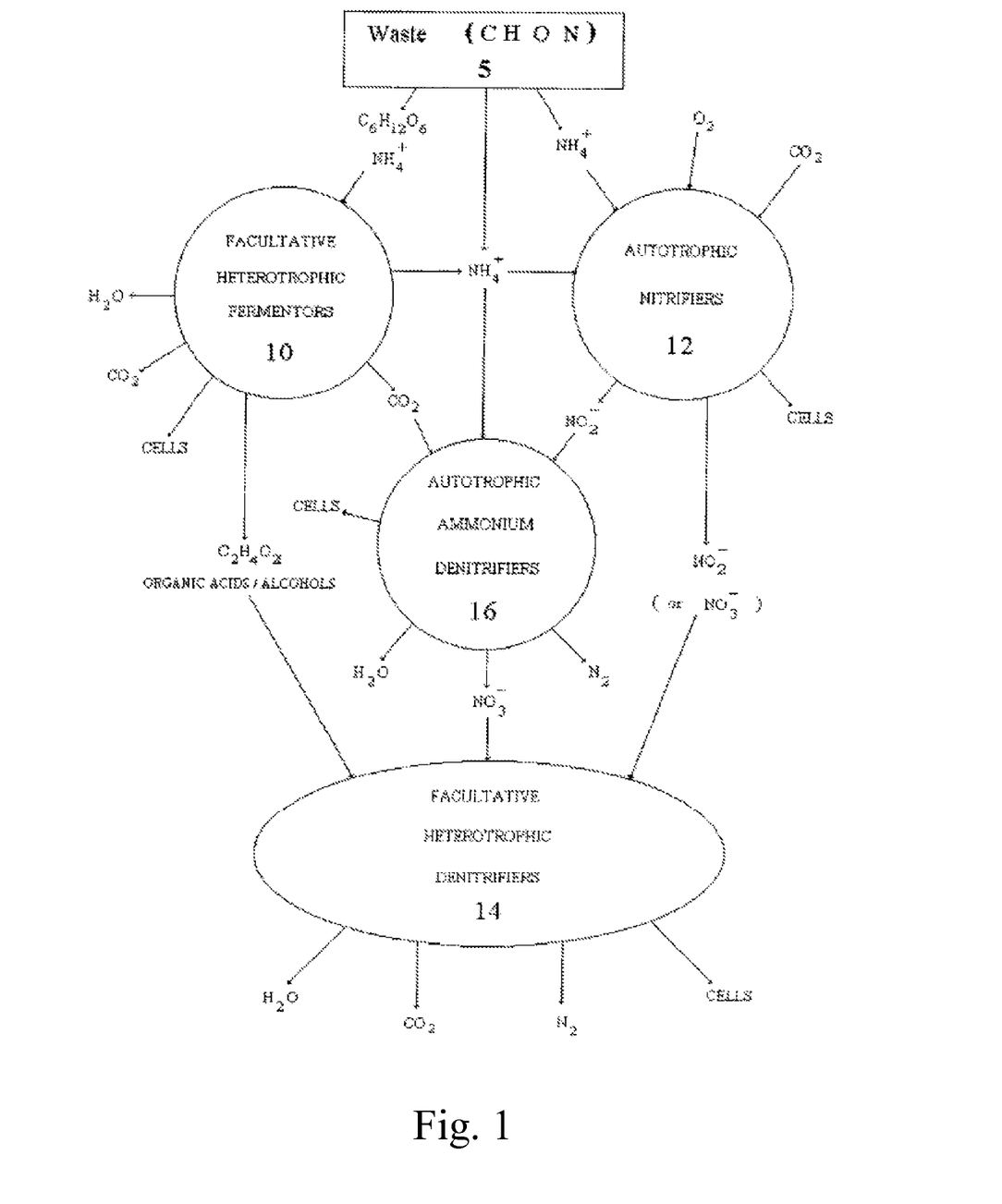
FIG. 1 comprises a schematic illustrating the predominant interrelationships of the organic waste, the major microbial groups responsible for bioconversion, the intermediate breakdown substances, and the final products of the process of the invention.

Very low oxygen concentrations are used to establish a population of facultative heterotrophic denitrifiers 14 that use the $NO_2^-$ and/or $NO_3^-$ produced by the autotrophic nitrifiers 12 as their electron acceptor instead of dissolved oxygen. These facultative heterotrophic denitrifiers 14 then convert the organic acids and alcohols produced by the facultative heterotrophic fermentors 10 and other waste stream organics present into $CO_2$ and $H_2O$ while reducing the $NO_2^-$ and/or $NO_3^-$ nitrogen to $N_2$. Sustaining low oxygen concentrations that are high enough to concurrently allow the autotrophic nitrifiers 12 to thrive and nitrify ammonium ($NH_4^+$) to $NO_2^-$ and/or $NO_3^-$ and low enough to establish populations of facultative heterotrophic denitrifiers 14 able to reduce $NO_2^-$ and/or $NO_3^-$ to $N_2$ is of benefit. The low oxygen environment also allows the establishment of autotrophic ammonium denitrifiers 16 capable of using $NO_2^-$ to oxidize $NH_4^+$ to $N_2$ and a small portion of $NO_3^-$ in reducing $CO_2$ to cell material (biomass). Application of the concurrent or simultaneous nitrification/denitrification process results in a nutrient rich humus material made by a process for the substantially odorless biological treatment of solid and liquid organic wastes, particularly animal farm wastes.

Thus, controlling the amount of oxygen introduced into a biological treatment process comprising a waste stream having a relatively high concentration of TKN and total BOD in a ratio of more than about 1:20, and preferably more than about 3:20, provides a strong niche for facultative heterotrophic denitrifiers. The organic acids and/or alcohols produced by the facultative heterotrophic fermentors, together with other organics present in the waste stream and dead microbial cells or cell fragments, efficiently combine with the nitrite and/or nitrate produced by the autotrophic nitrifiers to provide this strong niche for facultative heterotrophic denitrifiers and autotrophic ammonium denitrifiers. The facultative heterotrophic denitrifiers, in turn denitrify the nitrite and/or nitrate to nitrogen gas while the autotrophic ammonium denitrifiers oxidize $NH_4^+$ to $N_2$ as well and return $NO_3^-$ to the facultative heterotrophic denitrifiers. Ultimately, the organic waste is bioconverted to $N_2$, $CO_2$, $H_2O$, clean water and beneficial soil products. The low oxygen bioconversion process provides for substantially odorless, efficient, treatment of organic waste.

As described and shown by way of reactions in U.S. Pat. Nos. 6,689,274 (Morris and Northrop) and U.S. Pat. Nos. 6,908,495 (Morris and Northrop), reaction numbers 4, 5, and 6 depict the reactions for the nitrification of ammonia by autotrophic nitrifiers. Reaction 4 shows the general fundamental relationship for the endogenous energy producing reaction in which ammonia is nitrified to nitrite. Reaction 5 shows the general fundamental relationship for the coupling of reaction 4 with microbial cell synthesis. Reaction 6 illustrates how the combination of reactions 4 and 5 describes the observed yields of microbial cells that are synthesized during the nitrification of ammonia to nitrite by *Nitrosomonas* type bacterial species. Conventional nitrification processes employ a second step for the nitrification of nitrite to nitrate by *Nitrobacter* type bacterial species and that pathway may be present in the patented process as well to varying degrees depending on the specific dynamic operating conditions imposed. In contrast, however, the patented process described in U.S. Pat. Nos. 6,689,274 (Morris and Northrop) and U.S. Pat. No. 6,908,495 (Morris and Northrop) utilizes facultative heterotrophic denitrifiers and autotrophic ammonium denitrifiers to denitrify the nitrite to $N_2$. If nitrate were present or produced in the process, the facultative heterotrophic denitrifiers would denitrify it to $N_2$ as well. Reaction 7 shows this process relative to observed yields of microbial cells and reaction 8 shows the combined nitrification of ammonia to nitrate (reaction numbers 6 and 7), again relative to observed yields of microbial cells. The nitrate produced in the autotrophic ammonium denitrification reactions is consumed by denitrification reactions very similar to those shown in reactions 9, 10, and 11.

Based on the theoretical stoichiometry for that biological simultaneous nitrification/denitrification process, of the 4.57 g $O_2$/g N needed for complete oxidation of ammonia, approximately 3.43 g $O_2$/g N is used for nitrite production and the remaining 1.14 g $O_2$ are used per g $NO_2^-$ oxidized to nitrate. Metcalf & Eddy (2003) "Wastewater Engineering, Treatment and Reuse. When accounting for oxygen consumption into cell mass in the stoichiometry, the ratios decrease to 4.25 g $O_2$/g N needed for complete oxidation of ammonia and 3.22 g $O_2$/g N used for nitrite production. Id.

When optimizing the evolutionary criteria of a population of microbes according to the patented process, there is a preferred minimum population size and growth rate. This is expressed as both a minimum mass of microbes and as a function of total BOD and TKN loading. Generally the process requires a minimum population of about $10^{15}$ microbes or more, with an average doubling time of about 30 days or less. A less efficient process of the invention can be achieved with a greater quantity of microbes regenerating at a slower rate (i.e. a larger doubling time). The sustained minimum operating population is comprised of from about $10^{17}$ to about $10^{18}$ microbes with a doubling time of ten days or less to insure the presence of an adequate biomass to treat the waste stream. In addition to these minimum population size or mass criteria, it is also preferred to have at least $10^{13}$ microbes with a doubling period of 30 days or less, per pound of influent total BOD or TKN. These two biomass parameters can alternatively be expressed as more than about $10^{15}$ base pair replications per second for the minimum population and about $10^{17}$ base pair replications per pound of total BOD or TKN loaded into the treatment process. Most preferred values run about 100 times these figures.

The beneficial results of the low oxygen bioconversion process are believed to be a result of three general considerations. First, the process benefits from the presence of a dynamically responsive, diverse, microbial community in sufficient numbers or mass of microorganisms, growing at sufficient rates in the process to allow the microbial community to adapt in a workable time frame to achieve a dynamic equilibrium. Second, organic and nitrogen loading allows an energy, carbon and nitrogen balance to occur between the microbial populations of facultative heterotrophic fermentors, autotrophic nitrifiers, facultative heterotrophic denitrifiers and autotrophic ammonium denitrifiers. Third, control of dissolved oxygen levels and/or oxygen additions creates and maintains the populations of facultative heterotrophic fermentors, autotrophic nitrifiers, facultative heterotrophic denitrifiers and autotrophic ammonium denitrifiers.

Applicant has discovered an improved process to biologically treat nitrogen containing waste streams using a minimum oxygen mass loading based on TKN mass loading delivered via an alternating relatively short term exposure to aerobic conditions and relatively long term exposure to anoxic/anaerobic conditions, combined with the evolutionary criteria for microbial population of the process described in U.S. Pat. Nos. 6,689,274 (Morris and Northrop) and U.S. Pat. Nos. 6,908,495 (Morris and Northrop) in a novel and non-obvious manner to achieve odorless simultaneous nitrification/denitrification of the waste.

SUMMARY OF THE INVENTION

The principle object of this invention is to provide and manage a mixed microbial population which can interact with nitrogen contained in an aqueous stream. It is an object of the invention to treat nitrogen occurring as ammonia, ammonium ion, or organically bound nitrogen contained in a liquid stream (TKN). The microbes will act on various forms of nitrogen within the stream through an improved nitrification/denitrification process and will convert all or part of the nitrogen into dimolecular nitrogen gas ($N_2$) so that the nitrogen gas that can be harmlessly discharged to the atmosphere, or into a microbial cell mass which can be harvested for a variety of beneficial uses. It is a further object of this invention to produce a liquid effluent stream with a lower TKN concentration than the influent stream. It is a further object of this invention to suppress odor and air emissions during the treatment process.

In the process of the current invention a nitrogen-containing liquid waste stream, such as, for example, a municipal wastewater, organic industrial waste, foods processing streams, and particularly animal waste, is introduced into at least one of two distinct environments, volumes or zones, one aerobic with a dissolved oxygen concentration of greater than about 2.0 mg/L, and the other anoxic/anaerobic and having either no measurable dissolved oxygen concentration or a very low dissolved oxygen concentration less than about 2.0 mg/L, preferably less than 0.5 mg/L, and most preferably less than about 0.1 mg/L. This latter condition will be maintained by the absence of any type of aeration equipment or non-passive aeration in the anoxic/anaerobic volume.

The nitrogen containing influent stream will usually be introduced first into the anoxic/anaerobic volume, preferably in multiple locations within the anoxic/anaerobic volume, but it may also be introduced first into the aerobic volume. The anoxic/anaerobic volume accounts for most of the volume of the total treatment system volume (more than about 80 percent, preferably more than about 95 percent, and most preferably more than about 99 percent). The anoxic/anaerobic volume will usually be mixed, either through the presence of mechanical mixers, or through configurations determined by the tank geometry that create channels with flow deriving from the influent and or recycle pumps causing the mixing. If sufficient quantities of oxygen from the air are being transferred and dissolved into the liquid in the anoxic/anaerobic volume so that a measurable dissolved oxygen concentration can be detected in any significant portion of the anoxic/anaerobic volume, then a cover may be installed to prevent such transfer and maintain dissolved oxygen levels below measurable levels.

The aerobic volume will thus be relatively small compared with the anoxic/anaerobic volume (preferably about 1 or 2 percent of the volume of the anoxic/anaerobic volume). In the aerobic volume there is aeration, preferably vigorous aeration, and dissolved oxygen concentrations are greater than about 2.0 mg/L and preferably are greater than about 5.0 mg/L. Most preferably, dissolved oxygen concentrations will be close to saturation levels, e.g., 8.0 to 10.0 mg/L depending on temperature, pressure and other characteristics of the wastewater. The aerobic volume may be vigorously mixed with this mixing occurring via an aeration system, via the recycle flow being pumped through the aerobic volume, and/or by additional mechanical mixing equipment, if required.

Flow is continuously recycled from the anoxic/anaerobic volume through the aerobic volume and then back into the anoxic/anaerobic volume. This recycle flow rate will be relatively high as compared to the flow into the system so that virtually no individual microbe will be able to become resident within the aerobic volume but will only periodically pass through it. The aerobic volume will approximate complete mix conditions. In addition, the aeration rate within, and the flow rate through, the aerobic volume will be such that the total oxygen loading by weight to the entire system will not exceed 3.4 times the nitrogen loading (TKN) by weight to the system, and preferably will not exceed 3.2 times the nitrogen loading (TKN) by weight to the system. By limiting the expose time for the microorganisms in the aerobic volume to a short amount of time (an amount that will vary from one system to the next depending upon the oxygen uptake rate, temperature, mixed liquor suspended solids concentration, solids concentration, and other wastewater characteristics for any given operational condition) the process suppresses the growth and presence of aerobic heterotrophic microorganisms thereby also encouraging the growth and predominance of autotrophic nitrifiers, including a sub-type referred to herein as oxygen carrying nitrifiers ("OCN"). The preferred microorganism exposure time in the aerobic volume, assuming complete mix conditions with no solids accumulation (i.e., the hydraulic retention time equals the solids retention time for a single pass through the volume), is less than about 10 minutes, preferably between 2 and 10 minutes, possibly less than 2 minutes. These times are very small compared to the hydraulic retention times for aerobic volumes in conventional nitrification/denitrification systems.

Since the anoxic/anaerobic volume will also approximate complete mix conditions, the solids retention time (for a single pass) within the anoxic/anaerobic volume with respect to the sum of the influent and recycle flow rates is less than about 5 days and will preferably be less than about 1 day. In conjunction with the limited oxygen loading to the total system this will result in the microbes within the anoxic/anaerobic volume being periodically exposed to some dissolved oxygen within the aerobic volume but that exposure will generally be fast so that aerobic carbonaceous metabolism will be limited.

It is believed that these conditions, in conjunction with maintenance of a certain microbial population, generally a minimum population of about $10^{15}$ microbes or more, with an average doubling time of about 30 days or less. Preferably, a minimum population of no less than about $10^{17}$ to about $10^{18}$ microbes with a doubling time of ten days or less (alternatively expressed as at least $10^{13}$ microbes with a doubling period of 30 days or less, per pound of influent total BOD or TKN or more than about $10^{15}$ base pair replications per second for the minimum population and about $10^{17}$ base pair replications per pound of total BOD or TKN loaded into the treatment process), will promote the evolution of and result in the generation and selection of (likely through mutation during microorganism reproduction) a special group of nitrifying microorganisms, OCNs, that will have the characteristic of being able to accumulate oxygen, i.e., absorption of oxygen without immediate electron transfer and without immediate production of nitrite/nitrate. The OCNs, when they are in an environment with a high dissolved oxygen concentration (greater than about 2.0 mg/L) will absorb free oxygen and use that oxygen for nitrification over a protracted period of time, such as in the anoxic/anaerobic volume, even if they are no longer in an environment with any measurable dissolved oxygen concentration.

In the process of the invention the OCN will become a significant fraction of the total microbial distribution within the process, greater than about 5 percent of the total microbial biomass and in preferred embodiments of the process of the invention this fraction will be greater than about 20 percent, most preferably between about 20 and 50 percent.

The OCN population is optimized by frequently or continuously monitoring the nitrogen loading (TKN) to the system and then regulating the amount of oxygen by weight that is allowed to enter the system through the aeration equipment so that it does not exceed about 3.4 times, preferably does not exceed about 3.2 times, the total nitrogen (TKN) loading, if full treatment is desired. If only partial treatment of the influent nitrogen is desired then the total oxygen mass loading will be about 3.4 times, preferably about 3.2 times, the nitrogen loading (TKN) that is desired to be treated within the process. Limiting the oxygen in this manner suppresses the growth and population of heterotrophic carbonaceous material oxidizing microorganisms which in turn decreases the amount of oxygen needed for nitrification/denitrification as compared to the conventional nitrification/denitrification process.

Another control parameter used for optimizing the OCN population and hence total performance of the process comprises monitoring the time that the microbes are in the aerobic volume with each pass through the aerobic volume as compared to the time the microbes are in the anoxic/anaerobic volume with each pass through the anoxic/anaerobic volume. According to the process of the present invention, the ratio of the time for a microbe to pass once through the aerobic volume to the time for a microbe to pass once through the anoxic/anaerobic volume is less than about 20 percent, preferably less than about 5 percent, and most preferably less than about 1 percent. An alternative way to express this parameter is the ratio of the one pass SRT or one pass microbial exposure time for the aerobic volume to the one pass SRT or one pass microbial exposure time for the anoxic/anaerobic volume is less than about 20 percent, preferably less than about 5 percent, and most preferably less than about 1 percent.

The one pass SRTs or one pass microbial exposure times for the aerobic volume and anoxic/volume are each dependent upon and controlled by the size of the respective volumes and the flow rate through the aerobic volume. The one pass SRT or one pass microbial exposure time for the aerobic volume, assuming completely mixed conditions, is equal to the hydraulic retention time through the aerobic volume for each pass.

The overall one pass SRT or one pass microbial exposure time for the entire system (aerobic and anoxic/anaerobic volume) is the sum of both the one pass SRT for the aerobic volume or one pass microbial exposure time to the aerobic volume and the one pass SRT for the anaerobic volume or one pass microbial exposure time in the anaerobic volume. Notably, the one pass SRTs or one pass microbial exposure times are calculated differently than a system's overall SRT which takes into consideration solids accumulation, wasting and recycling.

Applicant has further discovered that in a preferred embodiment, the separated solids in the process of the invention can be mixed and/or recycled to maintain a desired mixed liquor concentration, to maintain a well mixed solids concentration, and to allow for solids retention times greater than the hydraulic retention time. The effluent from the process may be clarified by floating or settling, thickened, centrifuged, separated or treated by other equivalent concentrating means and recycled to maintain the biomass requirements. Excess microorganisms may be harvested, dewatered, and/or dried and sometimes further combined with other materials to create a nutrient rich humus material that can be beneficially used.

Applicant has therefore discovered an improved process for the biologically mediated conversion of organic waste and removal of nutrients from the waste. More specifically, the present invention addresses the odor emission problem common to organic wastes as well as the problem associated with high nutrient effluent discharge concentrations through the efficient, substantially odorless, biologically mediated conversion of waste excrement materials or a vast array of other organic wastes into stable, economically and/or ecologically beneficial materials.

Thus, it is an object of the present invention to provide an improved process for the efficient, substantially odorless, biological treatment of organic waste.

It is another object of the present invention to provide an improved limited oxygen biological nitrification and denitrification process for organic waste streams.

It is another object of the present invention to provide an improved process for the efficient, substantially odorless, biologically mediated transformation of organic wastes into suitable materials for recycling to the environment.

It is another object of the present invention to provide an improved process to create a biologically active, ecologically beneficial, substantially odorless humus material through the biologically mediated conversion of organic waste, particularly animal excrement.

The above and other objects and advantages of the present invention shall be made apparent from the accompanying drawings and the description thereof.

DESCRIPTION OF THE DRAWINGS

The accompanying drawings, which are incorporated in and constitute a part of this specification, illustrate embodiments of the invention and, together with the general description of the invention given above and the detailed description of an embodiment given below, serve to explain the principles of the present invention.

DETAILED DISCLOSURE

In the process of the present invention, evolution of a natural microbial community is encouraged under varying oxygen rich and oxygen depleted conditions according to certain criteria leading to a plurality of desirable ecological niches.

In the process of the current invention a nitrogen-containing liquid waste stream, such as, for example, a municipal wastewater, organic industrial waste, foods processing streams, and particularly animal waste, is introduced into at least one of two distinct environments, volumes or zones, one aerobic with a dissolved oxygen concentration of greater than about 2.0 mg/L, and the other anoxic/anaerobic and having either no measurable dissolved oxygen concentration or a very low dissolved oxygen concentration less than about 0.1 mg/L. The dissolved oxygen concentration in the aerobic volume is regulated and controlled to maintain greater than about 2.0 mg/L of dissolved oxygen, preferably greater than about 5.0 mg/L and most preferably near saturation (approximately 8.0 to 10.0 mg/L). The dissolved oxygen concentration in the anoxic/anaerobic volume is less than about 2.0 mg/L, preferably less than about 0.5 mg/L, and most preferably less than about 0.1 mg/L. This latter condition will be maintained by the absence of any type of aeration equipment or non-passive aeration in the anoxic/anaerobic volume.

The amount of oxygen by weight that is allowed to enter the system in the aerobic volume is monitored and regulated so as not to exceed about 3.4 times, preferably does not exceed about 3.2 times, the TKN loading of the influent waste stream, if full treatment is desired. If only partial treatment of the influent nitrogen is desired then the total oxygen mass loading will be about 3.4 times, preferably about 3.2 times, the nitrogen loading (TKN) that is desired to be treated within the process.

Maintenance of a certain microbial population is desired in the aerobic and anoxic/anaerobic volumes combined, generally a minimum population of about $10^{15}$ microbes or more, with an average doubling time of about 30 days or less, no less than about $10^{17}$ to about $10^{18}$ microbes with a doubling time of ten days or less (alternatively expressed as at least $10^{13}$ microbes with a doubling period of 30 days or less, per pound of influent total BOD or TKN or more than about $10^{15}$ base pair replications per second for the minimum population and about $10^{17}$ base pair replications per pound of total BOD or TKN loaded into the treatment process). Most preferred values run about 100 times these figures.

With reference to FIG. 1, populations of facultative heterotrophic fermentors 10 will thrive on the organic wastes 5 available, while the growth of obligate aerobes and obligate anaerobes, that might otherwise be expected to compete for the carbon and energy sources, are suppressed by the very low dissolved oxygen concentrations maintained in the anoxic/anaerobic volume. Within the anoxic/anaerobic volume, there may generally be enough oxygen available to inhibit obligate anaerobes but not enough to allow the obligate aerobes to be competitive.

In typical biological treatment processes enough oxygen is supplied to the facultative heterotrophs for complete bioconversion of the carbon containing compounds, typically during pretreatment, but possibly also within a slower single step process that allows for initial treatment of carbonaceous materials. In the process of the present invention it is believed that the limitation of the oxygen concentration in the anoxic/anaerobic volume induces the facultative heterotrophs to shift from an oxidative metabolism to a fermentative metabolism. Thus, the facultative heterotrophic fermentors ferment the organics present to organic acids and/or alcohols instead of oxidizing them through oxidative phosphorylation to carbon dioxide and water. Furthermore, although oxygen is supplied in the aerobic volume in the present invention, it is believed that limiting the amount of time that the microorganisms are exposed to the aerobic volume in relation to the time that the microorganisms reside in the anoxic/anaerobic volume after leaving the aerobic volume discourages and inhibits the growth of other microbial populations, such as heterotrophic aerobes, which usually dominate the bacteria present in conventional wastewater treatment processes. The relatively short aerobic exposure time, coupled with the relatively infrequent encountering of aerobic conditions, will also serve to suppress the likelihood that facultative heterotrophs that are operating with a fermentation metabolism will shift to an aerobic oxidative phosphorylation metabolism when they first are exposed to aerobic conditions. Microbes which occasionally rapidly shift to an aerobic metabolism, and then have to almost immediately shift back to fermentation, will be at an evolutionary disadvantage when competing with fermentative heterotrophs which do not use such shifts.

As a result of the fact that the evolutionarily favored facultative heterotrophic fraction of microorganisms will not act to use the oxygen that is presented so infrequently and for such restricted time intervals, the opportunity will exist for other organisms to use the available oxygen. Thus, the process will promote the evolution of, and result in the generation and selection of (likely through mutation during microorganism reproduction), a special group of autotrophic nitrifying microorganisms 14, OCNs, that will have the characteristic of being able to accumulate oxygen, i.e., absorption of oxygen without immediate electron transfer and without immediate production of nitrite/nitrate. The OCNs, when they are in the aerobic volume will absorb or capture free oxygen and use that oxygen for nitrification over a protracted period of time, such as in the anoxic/anaerobic volume, even if they are no longer in an environment with any measurable dissolved oxygen concentration.

Referring to FIG. 1, the organic acids and/or alcohols produced by the facultative heterotrophic fermentors 10, together with other organics present in the waste stream and dead microbial cells or cell fragments, will efficiently combine with the nitrite and/or nitrate produced by the autotrophic nitrifiers 12 to provide this strong niche for facultative heterotrophic denitrifiers 14 and autotrophic ammonium denitrifiers 16. The facultative heterotrophic denitrifiers 14, in turn denitrify the nitrite and/or nitrate to nitrogen gas while the autotrophic ammonium denitrifiers 16 oxidize $NH_4^+$ to $N_2$ as well and return $NO_3^-$ to the facultative heterotrophic denitrifiers 14. Ultimately, the organic waste is bioconverted to $N_2$, $CO_2$, $H_2O$, clean water and beneficial soil products. The limited oxygen bioconversion process of the present invention, therefore, provides for substantially odorless, efficient, treatment of organic waste.

When the flowable organic waste stream to the bioconversion process of the present invention contains relatively high concentrations of total BOD and TKN, and the TKN to total BOD by weight ratio is relatively high, e.g. when the mass ratio of TKN:total BOD is more than about 1:20 by weight, and preferably more than about 3:20, the resulting bioconversion process can be an effective processing approach for rapid, substantially odorless, bioconversion of the waste stream substrates with nitrification/denitrification.

In typical biological treatment processes enough oxygen is supplied to the facultative heterotrophs for complete biologically mediated conversion of the carbon containing compounds. In the process of the present invention it is believed that the temporal limitation of the exposure to relatively high oxygen concentrations, and the consequent restriction of the total possible oxygen mass loading, suppresses and/or inhibits the growth of the facultative heterotrophs that quickly switch to an oxidative phosphorylation metabolism upon any exposure to dissolved oxygen. This then provides the evolutionary opportunity for the OCNs to emerge and develop a selective advantage. They can use the intermittently available oxygen because they do not have to compete with facultative heterotrophs using a fermentation metabolism. Accordingly, the process of the present invention further comprises the control of the time that the microbial population is in the aerobic volume (microbial exposure time to aerobic conditions) compared to the time that the microbial population goes through the anoxic/anaerobic volume (microbial exposure time to anoxic/anaerobic conditions) for each pass through both. The ratio of the time per pass through the volumes may be controlled through the sizing of the volumes. The preferred microorganism exposure time in the aerobic volume, assuming complete mix conditions with no solids accumulation is less than about 10 minutes, preferably between about 2 and 10 minutes, possibly less than about 2 minutes.

Expressed as a ratio of time per pass in each volume, the preferred ratio is less than about 0.2, preferably less than about 0.05, and most preferably less than about 0.01. Expressed using the per pass SRT or per pass microbial exposure time through each volume, the ratio of the per pass SRT or per pass microbial exposure time through the aerobic volume to the per pass SRT or per pass microbial exposure time through the anoxic/anaerobic volume is less than about 0.2, preferably less than about 0.05, and most preferably less than about 0.01. Assuming a 1 to 20 flow rate ratio of influent flow to internal recycle flow and completely mixed conditions, the resulting approximately equivalent volumetric ratio (aerobic to anoxic/anaerobic) is less than about 0.05.

Figure 2:
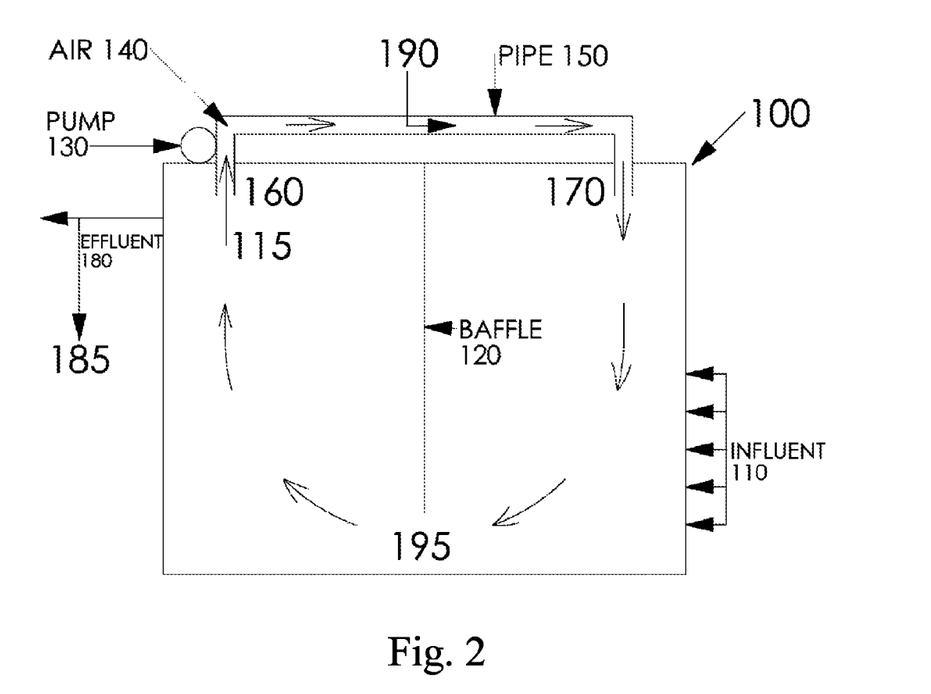
FIG. 2 comprises a schematic flow diagram of an embodiment of the process of the invention using a recycle pump and pipe and aeration in the pipe.

For example, in one embodiment of the process of the invention, as shown in FIG. 2, an influent waste stream 110 is directed into an anoxic/anaerobic volume 195, preferably in multiple locations, defined by a lagoon, tank, pond, bermed area, or the like 100, wherein the waste stream is biologically treated at dissolved oxygen concentrations of less than about 2.0 mg/L, preferably less than about 0.5 mg/L and most preferably less than about 0.1 mg/L. In the process of the invention shown in FIG. 2, a baffle 120 is used to direct flow and/or create a long flow path within the anoxic/anaerobic volume. It is understood and appreciated that other flow control devices and mechanisms could be used to achieve the same result, such as, for example, separate tankage or elongated rectangular configuration with length being much greater than width say 5:1 or greater.

A liquid stream 115 is pumped by pump 130 from one area of the anoxic/anaerobic volume through inlet 160, through pipe 150 wherein the liquid stream 115 is vigorously aerated using an aeration means 140 that may include air pumps, diffusers, mechanical aerators, and the like, and then the flow is discharged through the pipe outlet 170 back into the anoxic/anaerobic volume 195, preferably in a location different from the pipe inlet 160 and most preferably maximally separated from the inlet 160 to maximize the microbial exposure time per pass within the anoxic/anaerobic volume 195. In this embodiment, the volume within the pipe 190 plus any aerobic plume that may exist in a small volume after the flow exits outlet 170 as a function of discharge flowrate defines the aerobic volume 190. The dissolved oxygen concentration in the aerobic volume may be controlled by adjusting the aeration rate and the oxygen mass loading into the aerobic volume to less than about 3.4 times the total nitrogen loading in the influent 110, preferably less than about 3.2 times the nitrogen loading, or if a lower level of treatment is desired then less than about 3.4 times, preferably then less than about 3.2 times, the desired nitrogen loading treatment. It is believed that the substantial portion of nitrification/denitrification is performed in the anoxic/anaerobic volume but some nitrification and/or denitrification may also occur in the aerobic volume. The treated effluent stream 180 contains reduced nitrogen concentrations.

In one embodiment the volumes are selected, regulated and or adjusted such that the ratio of the one pass SRT or one pass microbial exposure time in the aerobic volume 190 to the one pass SRT or one pass microbial exposure time in the anoxic/anaerobic volume 195 is less than about 0.2, preferably less than about 0.05, and most preferably less than about 0.01. In another embodiment the size of aerobic volume 190 and the size of the anoxic/anaerobic volume 195 are selected and/or adjusted to a volumetric ratio of less than about 0.2 and preferably less than about 0.01. Dissolved oxygen concentrations in the aerobic volume 190 may be monitored and used to control the dissolved oxygen concentrations and mass of oxygen transferred.

The solids in the system, a microorganism active by-product of the biological processes, may be separated, mixed and/or recycled to maintain a desired mixed liquor concentration, to maintain a well mixed solids concentration, and control the overall system SRT. The effluent from the process may be clarified by floating or settling, thickened, centrifuged, separated or treated by other equivalent concentrating means and recycled to maintain biomass requirements. Excess microorganisms 185 may be harvested, dewatered, and/or dried and sometimes further combined with other materials to create a nutrient rich humus material that can be beneficially used.

Figure 3:
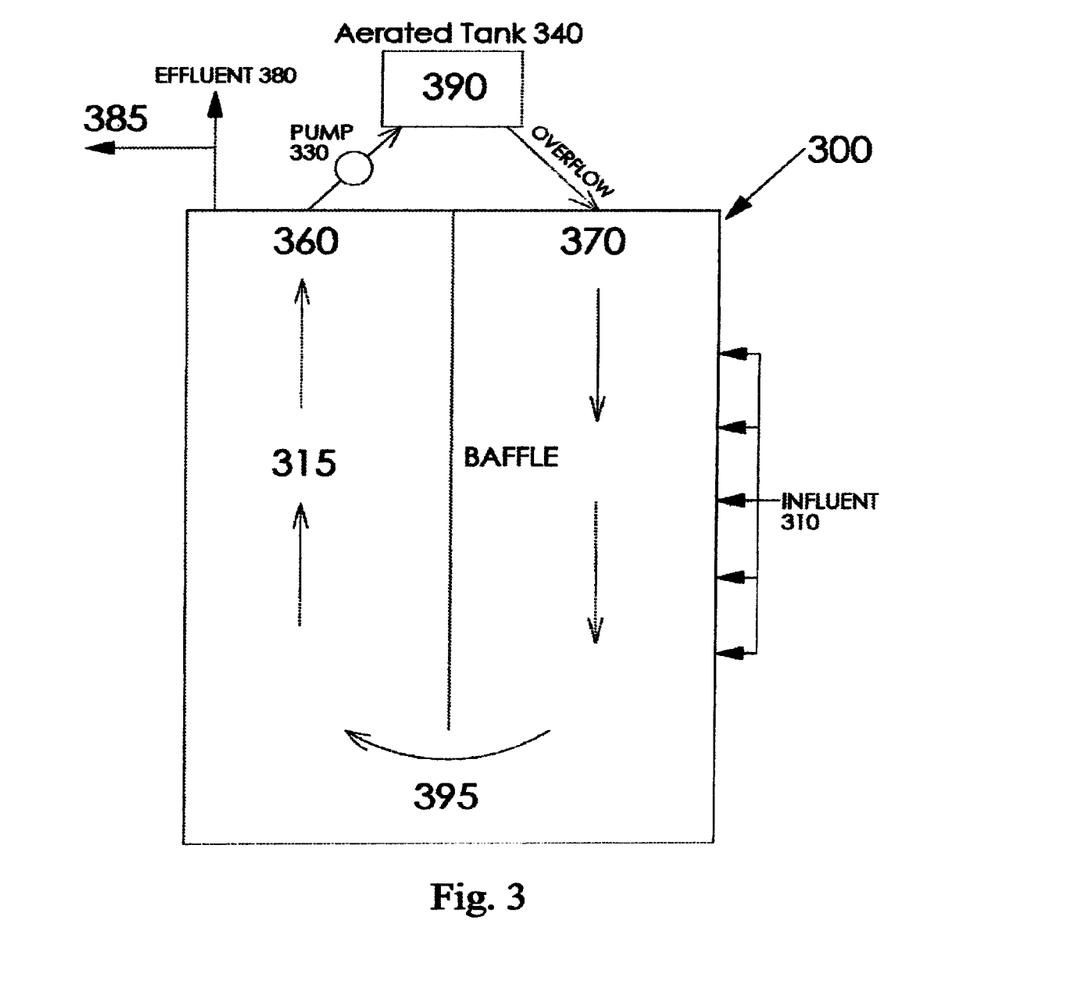
FIG. 3 comprises a schematic flow diagram of an embodiment of the process of the invention using a separate aeration tank or vessel for an aerobic volume physically separate from the anoxic/anaerobic volume.

FIG. 3 is a flow diagram of another embodiment of the invention using an aeration tank, pond, lagoon, bermed area, vessel or the like for an aerobic volume external to the physical borders of the anoxic/anaerobic volume instead of the pipe shown in FIG. 2. The process of the invention shown in FIG. 3 operates in substantially the same manner as previously described in FIG. 2. Waste stream 310 is directed into an anoxic/anaerobic volume 395 defined by a lagoon, tank, pond, bermed area, or the like 300, wherein the waste is biologically treated at dissolved oxygen concentrations of less than about 2.0 mg/L, preferably less than about 0.5 mg/L, and most preferably less than about 0.1 mg/L. In the process of the invention shown in FIG. 3, a baffle is used to direct flow and/or create a long flow path within the anoxic/anaerobic volume. It is understood and appreciated that other flow control devices and mechanisms could be used to achieve the same result, such as, for example, separate tankage or elongated rectangular configuration with length being much greater than width say 5:1 or greater.

A liquid stream 315 is pumped by pump 330 from one area of the anoxic/anaerobic volume through inlet 360 wherein the liquid stream 315 is aerated using an aeration means 340 that may include air pumps, diffusers, mechanical aerators, and the like, and then the flow 315, which could be an overflow, is discharged through outlet 370 back into the anoxic/anaerobic volume 395, preferably in a location different from the pipe inlet 360 and most preferably maximally separated from the inlet 360 to maximize the one pass SRT or one pass microbial exposure time within the anoxic/anaerobic volume 395. In this embodiment, the volume within the aeration tank plus any aerobic plume that may exist in a small volume after the flow exits the outlet 370 as a function of discharge flowrate defines the aerobic volume 390. The dissolved oxygen concentration in the aerobic volume 390 may be controlled by adjusting the aeration rate and the oxygen mass loading into the aerobic volume 390 to less than about 3.4 times the total nitrogen loading in the influent 310, preferably less than about 3.2 times the nitrogen loading, or if a lower level of treatment is desired then less about 3.4 times, preferably less than about 3.2 times, the desired nitrogen loading treatment. It is believed that the substantial portion of nitrification/denitrification is performed in the anoxic/anaerobic volume 395 but some nitrification and/or denitrification may also occur in the aerobic volume 390. The treated effluent stream 380 contains reduced nitrogen concentrations.

In one embodiment the volumes are selected, regulated and or adjusted such that the ratio of the one pass SRT or one pass microbial exposure time in the aerobic volume 390 to the one pass SRT or one pass microbial exposure time in the anoxic/anaerobic volume 395 is less than about 0.2, preferably less than about 0.05, and most preferably less than about 0.01. In another embodiment the size of aerobic volume 390 and the size of the anoxic/anaerobic volume 395 are selected and/or adjusted to a volumetric ratio of less than about 0.2 and preferably less than about 0.01. Dissolved oxygen concentrations in the aerobic volume 390 may be monitored and used to control the dissolved oxygen concentrations and mass of oxygen transferred.

The resulting solids in the system is a microorganism active by-product of the biological processes may be separated, mixed and/or recycled to maintain a desired mixed liquor concentration, to maintain a well mixed solids concentration, and control the overall system SRT. The effluent 380 from the process may be clarified by floating or settling, thickened, centrifuged, separated or treated by other equivalent concentrating means and recycled to maintain the biomass requirements. Excess microorganisms 385 may be harvested, dewatered, and/or dried and sometimes further combined with other materials to create a nutrient rich humus material that can be beneficially used.

The present invention is not limited to an aerobic volume located almost entirely external to the physical boundaries of the anoxic/anaerobic volume defined by a lagoon, tank, pond, bermed area, or the like, as shown in FIG. 2 by way of a pipe and in FIG. 3 by way of a tank or vessel. In the embodiment of the invention shown in FIG. 4, a baffled area within or adjoining a tank or pond containing an anoxic/anaerobic may be used.

Figure 4:
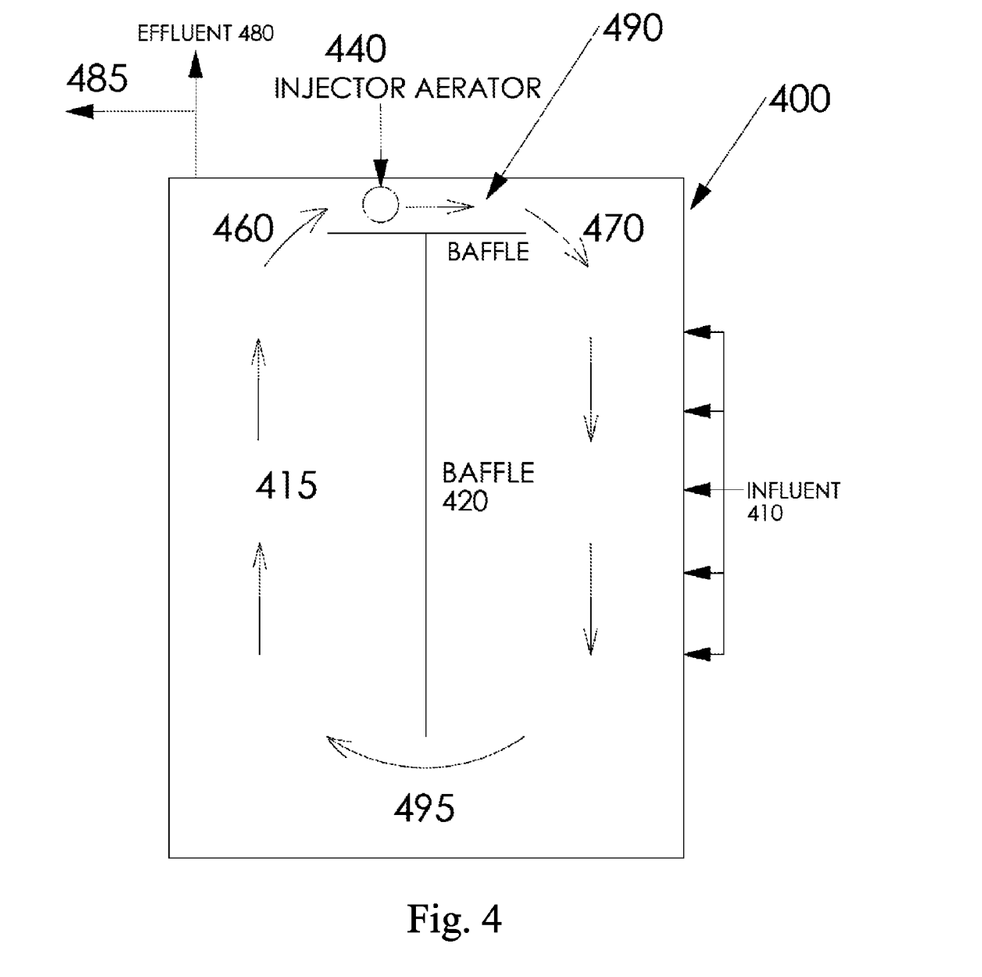
FIG. 4 comprises a schematic flow diagram of an embodiment of the process of the invention using an injection aerator and baffling within the anoxic/anaerobic volume.

As shown in FIG. 4, an influent waste stream 410 is directed into an anoxic/anaerobic volume 495 containing within it an aerobic volume 490, both collectively defined by a lagoon, tank, pond, bermed area, or the like 400, wherein the waste steam is biologically treated and nitrification/denitrification is achieved. The anoxic/anaerobic volume 495 has dissolved oxygen concentration of less than about 2.0 mg/L, preferably less than about 0.5 mg/L, and most preferably less than about 0.1 mg/L. In the process of the invention shown in FIG. 4, a baffle 420 is used to direct flow and/or create a long flow path within the anoxic/anaerobic volume 495. It is understood and appreciated that other flow control devices and mechanisms could be used to achieve the same result, such as, for example, separate tankage or elongated rectangular configuration with length being much greater than width say 5:1 or greater.

A liquid stream 415 may be pumped by pump 430 from one area of the anoxic/anaerobic volume 495 through inlet 460 to a baffled area wherein the liquid stream 415 is vigorously aerated using an aeration means 440 that may include surface injection aerators or air injection pumps or similar equipment capable of creating and discharging an aerated stream of liquid at a specific location within a tank, pond, bermed area, vessel, or the like, and then the flow 415 is discharged through the outlet 470 back into the anoxic/anaerobic volume 495, preferably in a location different from the inlet 460 and most preferably maximally separated from the inlet 460 to maximize the SRT per pass or microbial exposure time per pass through the anoxic/anaerobic volume 495. In this embodiment, the volume within the baffled area plus any aerobic plume that may exist in a small volume after the flow exits the outlet 470 as a function of discharge flowrate defines the aerobic volume 490. The dissolved oxygen concentration in the aerobic volume 490 may be controlled by adjusting the aeration rate and the oxygen mass loading into the aerobic volume 490 to less than about 3.4 times the total nitrogen loading in the influent 410, preferably less than about 3.2 times the nitrogen loading, or if a lower level of treatment is desired then less about 3.4 times, preferably less than about 3.2 times, the desired nitrogen loading treatment. It is believed that a substantial portion of the nitrification/denitrification is performed in the anoxic/anaerobic volume 495 but some nitrification and/or denitrification may also occur in the aerobic volume 490. The treated effluent stream 480 contains reduced nitrogen concentrations.

In one embodiment the volumes are selected, regulated and or adjusted such that the ratio of the one pass SRT or one pass microbial exposure time in the aerobic volume 490 to the one pass SRT or one pass microbial exposure time in the anoxic/anaerobic volume 495 is less than about 0.2, preferably less than about 0.05, and most preferably less than about 0.01. In another embodiment the size of aerobic volume 490 and the size of the anoxic/anaerobic volume 495 are selected and/or adjusted to a volumetric ratio of less than about 0.2 and preferably less than about 0.01. Dissolved oxygen concentrations in the aerobic volume 490 may be monitored and used to control the dissolved oxygen concentrations and mass of oxygen transferred.

The resulting solids in the system is a microorganism active by-product of the biological processes may be separated, mixed and/or recycled to maintain a desired mixed liquor concentration, to maintain a well mixed solids concentration, and control the overall system SRT. The effluent 480 from the process may be clarified by floating or settling, thickened, centrifuged, separated or treated by other equivalent concentrating means and recycled to maintain the biomass requirements. Excess microorganisms 485 may be harvested, dewatered, and/or dried and sometimes further combined with other materials to create a nutrient rich humus material that can be beneficially used.

Figure 5:
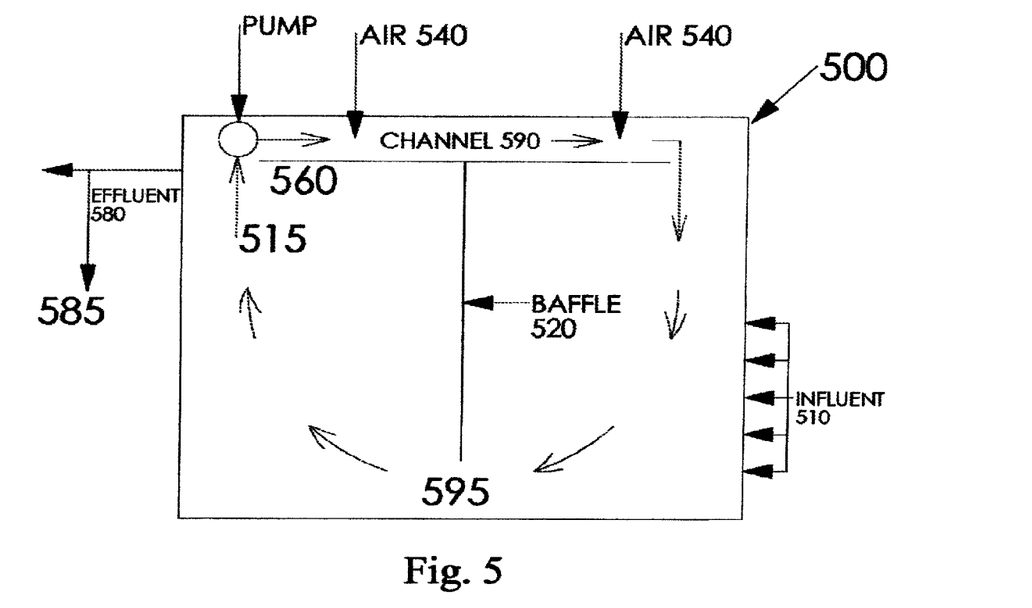
FIG. 5 comprises a schematic flow diagram of an embodiment of the process of the invention using a segregated channel, which may or may not have a depth less than the entire tank depth for the anoxic/anaerobic volume, for the aerobic volume within the larger pond or tank or vessel also containing the anoxic/anaerobic volume.

FIG. 5 comprises a flow diagram of an embodiment of the process of the invention using aerators and a channel to create an aerobic volume 590 within the physical boundaries of a larger anoxic/anaerobic volume 595 similar to the embodiment shown in FIG. 4 but here, with use of a clearly defined channel. In the embodiment shown in FIG. 5, the aerobic volume 590 comprises and aeration means, here shown schematically as air pumps, diffusers, mechanical aerators, and the like. The discharged aerated stream of liquid from the aerobic volume 590 will be directed so that it creates a flow path substantially throughout the anoxic/anaerobic volume 595 such that the discharged aerated liquid will not return to the inlet location for the aeration means 540 for a maximized period of time.

As shown in FIG. 5, an influent waste stream 510 is directed into an anoxic/anaerobic volume 595 at one or more locations (it is noted that the influent waste stream may also be first directed into the aerobic volume 590 and/or divided and directed into both the aerobic volume 590 and the anoxic/anaerobic volume 595 and such processes are within the scope of the present invention for this and other embodiments) containing within it an aerobic volume 590, both collectively defined by a lagoon, tank, pond, bermed area, or the like 500, wherein the waste steam is biologically treated and nitrification/denitrification is achieved. The anoxic/anaerobic volume 595 has dissolved oxygen concentrations of less than about 2.0 mg/L, preferably less than 0.5 mg/L, and most preferably less than about 0.1 mg/L. In the process of the invention shown in FIG. 5, baffles 520 are used to direct flow and/or create a long flow path within the anoxic/anaerobic volume 595. It is understood and appreciated that other flow control devices and mechanisms could be used to achieve the same result, such as, for example, separate tankage or elongated rectangular configuration with length being much greater than width say 5:1 or greater.

A liquid stream 515 is directed from one area of the anoxic/anaerobic volume 595 to the aerobic volume 590 wherein the liquid stream 515 is aerated using an aeration means 540 that may include air pumps, diffusers, mechanical aerators, and the like, and then the flow 515 is discharged back into the anoxic/anaerobic volume 595, preferably in a location different from the inlet 460 and most preferably maximally separated from the inlet 560 to maximize the one pass SRT or one pass microbial exposure time within the anoxic/anaerobic volume 595.

In one embodiment the volumes are selected, regulated and or adjusted such that the ratio of the one pass SRT or one pass microbial exposure time in the aerobic volume 590 to the one pass SRT or one pass microbial exposure time in the anoxic/anaerobic volume 595 is less than about 0.2, preferably less than about 0.05, and most preferably less than about 0.01. In another embodiment the size of aerobic volume 590 and the size of the anoxic/anaerobic volume 595 are selected and/or adjusted to a volumetric ratio of less than about 0.2 and preferably less than about 0.01. Dissolved oxygen concentrations in the aerobic volume 590 may be monitored and used to control the dissolved oxygen concentrations and mass of oxygen transferred.

The resulting solids in the system is a microorganism active by-product of the biological processes may be separated, mixed and/or recycled to maintain a desired mixed liquor concentration, to maintain a well mixed solids concentration, and control the overall system SRT. The effluent 580 from the process may be clarified by floating or settling, thickened, centrifuged, separated or treated by other equivalent concentrating means and recycled to maintain the biomass requirements. Excess microorganisms 585 may be harvested, dewatered, and/or dried and sometimes further combined with other materials to create a nutrient rich humus material that can be beneficially used.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicant's invention.

What is claimed is:

1. A method for nitrification and denitrification of an aqueous organic waste containing a total TKN nitrogen loading without pretreatment for BOD/COD removal comprising:
   biologically treating said waste in an anoxic/anaerobic volume having a dissolved oxygen concentration less than about 2.0 mg/L, wherein at least a portion of said waste is recycled through an aerobic volume;
   adding oxygen in said aerobic volume in an amount less than about 3.4 times the total TKN nitrogen loading in said waste;
   wherein the ratio of the time for a microorganism to pass once through said aerobic volume to the time for a microorganism to pass once through said anoxic/anaerobic volume is less than about 0.2;
   wherein said waste is simultaneously nitrified and denitrified.

2. The method of claim 1, wherein the time for a microorganism to pass once through said aerobic volume is less than about 10 minutes.

3. The method of claim 2, wherein the time for a microorganism to pass once through said aerobic volume is less than about 2 minutes.

4. The method of claim 1, wherein oxygen is added in said aerobic volume in an amount less than about 3.2 times the total TKN nitrogen loading in said waste.

5. The method of claim 4, wherein the time for a microorganism to pass once through said aerobic volume is less than about 10 minutes.

6. The method of claim 5, wherein the time for a microorganism to pass once through said aerobic volume is less than about 2 minutes.

7. The method of claim 1, wherein the dissolved oxygen concentration is said aerobic volume is greater than about 2.0 mg/L.

8. The method of claim 7, wherein the dissolved oxygen concentration is said aerobic volume is greater than about 5.0 mg/L.

9. The method of claim 8, wherein the dissolved oxygen concentration is said aerobic volume is greater than about 8.0 mg/L.

10. The method of claim 1, wherein the dissolved oxygen concentration in said anoxic/anaerobic volume is less than about 0.5 mg/L.

11. The method of claim 10, wherein the dissolved oxygen concentration in said anoxic/anaerobic volume is less than about 0.1 mg/L.

12. A method for nitrification and denitrification of an aqueous organic waste containing nitrogen comprising:
    biologically treating said waste in an anoxic/anaerobic volume having a dissolved oxygen concentration less than about 2.0 mg/L, wherein at least a portion of said waste is recycled through an aerobic volume; and
    adding oxygen in said aerobic volume in an amount less than about 3.4 times the total TKN nitrogen loading in said waste;
    wherein the ratio of the one pass microbial exposure time in said aerobic volume to the one pass microbial exposure in said anoxic/anaerobic volume is less than about 0.2;
    wherein said aerobic volume and said anoxic/anaerobic volume combined contain about $10^{15}$ or more biological microorganisms with an average doubling time of less than about 30 days; and
    wherein said waste is simultaneously nitrified and denitrified.

13. The method of claim 12, wherein said ratio of the one pass microbial exposure time in said aerobic volume to the one pass microbial exposure time in said anoxic/anaerobic volume is less than about 0.02.

14. The method of claim 13, wherein said ratio of the one pass microbial exposure time in said aerobic volume to the one pass microbial exposure time in said anoxic/anaerobic volume is less than about 0.01.

15. The method of claim 12, wherein the one pass microbial exposure time in said aerobic volume is less than about 10 minutes.

16. The method of claim 15, wherein the one pass microbial exposure time in said aerobic volume is less than about 2 minutes.

17. The method of claim 12, wherein oxygen is added in said aerobic volume in an amount less than about 3.2 times the total TKN nitrogen loading in said waste.

18. The method of claim 17, wherein the one pass microbial exposure time in said aerobic volume is less than about 10 minutes.

19. The method of claim 18, wherein the one pass microbial exposure time in said aerobic volume is less than about 2 minutes.

20. The method of claim 12, wherein the dissolved oxygen concentration is said aerobic volume is greater than about 2.0 mg/L.

21. The method of claim 20, wherein the dissolved oxygen concentration is said aerobic volume is greater than about 5.0 mg/L.

22. The method of claim 21, wherein the dissolved oxygen concentration is said aerobic volume is greater than about 8.0 mg/L.

23. The method of claim 12, wherein the dissolved oxygen concentration in said anoxic/anaerobic volume is less than about 0.5 mg/L.

24. The method of claim 23, wherein the dissolved oxygen concentration in said anoxic/anaerobic volume is less than about 0.1 mg/L.

25. The method of claim 12, wherein the ratio of the size of the aerobic volume to the size of the anoxic/anaerobic volume is less than about 0.02.

26. The method of claim 25, wherein the ratio of the size of the aerobic volume to the size of the anoxic/anaerobic volume is less than about 0.01.

27. A method for nitrification and denitrification of an organic waste in aqueous form comprising:

monitoring the incoming nitrogen loading in said waste;

biologically treating said waste in an anoxic/anaerobic volume having a dissolved oxygen concentration less than about 0.2 mg/L;

biologically treating said waste in an aerobic volume having a dissolved oxygen concentration greater than about 2.0 mg/L and regulating the mass of oxygen added in said aerobic volume to less than about 3.4 times a predetermined desired level of nitrogen treatment; and recycling said treated waste from said aerobic volume to said anoxic/anaerobic volume for further biological treatment;

wherein the ratio of the per pass SRT for the aerobic volume to the per pass SRT for the anoxic/anaerobic volume is less than about 0.2;

wherein said incoming nitrogen is nitrified and denitrified.

28. The method of claim 27, wherein the ratio of the per pass SRT for the aerobic volume to the per pass SRT for the anoxic/anaerobic volume is less than about 0.05.

29. The method of claim 28, wherein the ratio of the per pass SRT for the aerobic volume to the per pass SRT for the anoxic/anaerobic volume is less than about 0.01.

30. The method of claim 29, wherein said aerobic volume and said anoxic/anaerobic volume combined contain about $10^{15}$ or more biological microorganisms with an average doubling time of less than about 30 days.

31. The method of claim 29, wherein said aerobic volume and said anoxic/anaerobic volume combined contain greater than about $10^{17}$ microbes with a doubling time of less than about ten days.

32. The method of claim 27, wherein said aerobic volume and said anoxic/anaerobic volume combined contain about $10^{15}$ or more biological microorganisms with an average doubling time of less than about 30 days.

33. The method of claim 27, wherein said aerobic volume and said anoxic/anaerobic volume combined contain greater than about $10^{17}$ microbes with a doubling time of less than about ten days.

34. A system for treatment of an organic waste in aqueous form comprising:

equipment for monitoring the incoming nitrogen loading in said waste measured as TKN;

an anoxic/anaerobic volume wherein said waste is biologically treated under conditions having a dissolved oxygen concentration less than about 0.2 mg/L;

an aerobic volume comprising an aeration means for adding oxygen in said aerobic volume in an amount less than about 3.4 times a predetermined desired level of nitrogen treatment, wherein a portion of said waste from said anoxic/anaerobic volume is biologically treated in said aerobic zone under condition having a dissolved oxygen concentration greater than about 2.0 mg/L;

wherein the ratio of the size of the aerobic volume to the size of the anoxic/anaerobic volume is less than about 0.02.

35. The system of claim 34, wherein the ratio of the size of the aerobic volume to the size of the anoxic/anaerobic volume is less than about 0.01.

36. The system of claim 34, wherein the dissolved oxygen concentration is said aerobic volume is greater than about 5.0 mg/L.

37. The system of claim 36, wherein the dissolved oxygen concentration is said aerobic volume is greater than about 8.0 mg/L.

38. The system of claim 34, wherein the dissolved oxygen concentration in said anoxic/anaerobic volume is less than about 0.1 mg/L.

39. The system of claim 34, wherein the time for a microorganism to pass once through said aerobic volume is less than about 10 minutes.

40. The system of claim 39, wherein the time for a microorganism to pass once through said aerobic volume is less than about 2 minutes.

* * * * *